US009156099B2

(12) United States Patent
Hamann et al.

(10) Patent No.: US 9,156,099 B2
(45) Date of Patent: Oct. 13, 2015

(54) METHOD FOR INDUCTIVE HARDENING OF TEETH OF GEARWHEELS

(71) Applicant: Siemens Aktiengesellschaft, München (DE)

(72) Inventors: Jens Hamann, Fürth (DE); Hans-Georg Köpken, Erlangen (DE); Björn Rosenbaum, Erlangen (DE); Andreas Ulrich, Wendelstein (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 270 days.

(21) Appl. No.: 13/713,670

(22) Filed: Dec. 13, 2012

(65) Prior Publication Data

US 2013/0152394 A1 Jun. 20, 2013

(30) Foreign Application Priority Data

Dec. 14, 2011 (EP) .................................... 11193442

(51) Int. Cl.
  B23F 17/00 (2006.01)
  C21D 1/42 (2006.01)
  C21D 9/32 (2006.01)
  C21D 1/10 (2006.01)

(52) U.S. Cl.
  CPC .............. B23F 17/006 (2013.01); C21D 1/10 (2013.01); C21D 1/42 (2013.01); C21D 9/32 (2013.01); *Y10T 29/49476* (2015.01)

(58) Field of Classification Search
  CPC .............. B23F 17/006; B23F 19/00–19/125; B23P 15/14; B21K 1/30; B21K 1/305; B21H 5/022; C21D 1/10; C21D 1/42; C21D 9/32; Y10T 29/49476

USPC .......... 29/893, 893.3, 893.35, 893.36, 893.37; 409/25, 26, 50, 51, 52, 903; 408/103; 219/677, 676, 647, 659
  See application file for complete search history.

(56) References Cited

U.S. PATENT DOCUMENTS 2,167,798 A * 8/1939 Denneen et al. ............... 219/640
4,251,704 A * 2/1981 Masie et al. .................. 219/640
(Continued)

FOREIGN PATENT DOCUMENTS

CN        1145840 A     3/1997
CN     1019146659 A    12/2010
(Continued)

OTHER PUBLICATIONS

"5-Achsen-Fräsen ersetzt klassisches Verzahnen"; Technische Rundschau, Hallwag AG, CH, vol. 102, No. 4, Apr. 16, 2010; pp. 63-66; ISSN: 1023-0823; Magazine; 2010.
(Continued)

*Primary Examiner* — Sarang Afzali
(74) *Attorney, Agent, or Firm* — Henry M. Feiereisen LLC

(57) ABSTRACT

In a method for manufacturing a gearwheel, a gearwheel blank is clamped in a workholder of a multi-axis machine tool. A milling head is clamped in a tool holder which is rotated by a spindle drive to enable the milling head to mill out tooth spaces of the gearwheel blank to thereby create a gearwheel having teeth. After replacing the milling head in the tool holder with an inductor, the inductor is inserted successively between two adjacent teeth of the gearwheel and supplied with alternating current from a current supply device of the spindle drive to inductively heat at least one of the two adjacent teeth. The inductor in the tool holder is then replaced with a machining tool to remachine the teeth of the gearwheel.

9 Claims, 5 Drawing Sheets

(56) References Cited

U.S. PATENT DOCUMENTS

| | | | |
|---|---|---|---|
| 4,639,279 A * | 1/1987 | Chatterjee | 219/640 |
| 4,675,488 A * | 6/1987 | Mucha et al. | 219/640 |
| 4,746,101 A * | 5/1988 | Scott | 266/83 |
| 5,885,199 A * | 3/1999 | Shao | 483/19 |
| 2005/0161132 A1* | 7/2005 | Gillette et al. | 148/573 |
| 2010/0202847 A1 | 8/2010 | Moser et al. | |
| 2011/0155722 A1* | 6/2011 | Johnson et al. | 219/640 |
| 2012/0205364 A1 | 8/2012 | Suominen et al. | |

FOREIGN PATENT DOCUMENTS

| | | |
|---|---|---|
| DE | 888141 C | 8/1953 |
| DE | 10 2007 051 375 A1 | 1/2009 |
| EP | 0810048 A1 | 12/1997 |
| GB | 816352 A | 7/1959 |
| JP | H0918925 A | 1/1997 |
| JP | H11222626 A | 8/1999 |
| JP | 2001115212 A | 4/2001 |
| WO | WO 2011020952 A1 | 2/2011 |

OTHER PUBLICATIONS

Markus Nuding: MF-Umrichtertechnologie zur Vereinfachung induktiver Erwärmprozesse; in: elektrowärme international, Heft Jan. 2009—März; Magazine.

* cited by examiner

METHOD FOR INDUCTIVE HARDENING OF TEETH OF GEARWHEELS

CROSS-REFERENCES TO RELATED APPLICATIONS

This application claims the priority of European Patent Application, Serial No. EP 11193442, filed Dec. 14, 2011, pursuant to 35 U.S.C. 119(a)-(d), the content of which is incorporated herein by reference in its entirety as if fully set forth herein.

BACKGROUND OF THE INVENTION

The present invention relates to a process for manufacturing a gearwheel.

The following discussion of related art is provided to assist the reader in understanding the advantages of the invention, and is not to be construed as an admission that this related art is prior art to this invention.

Large gearwheels are generally manufactured as individual pieces or in small series. A gearwheel blank is hereby first clamped in a workholder of a special gear cutting machine. In this state tooth spaces are milled out of the gearwheel blank by a milling head, so that by milling out the tooth spaces from the gearwheel blank a gearwheel having teeth is produced. The premachined gearwheel is then removed from the gear cutting machine and placed in a furnace. There the gearwheel is heated as a whole and is hardened—generally with the addition of additives. Then in a further machine tool the teeth of the gearwheel are remachined, for example remilled or reground.

This process is time-consuming, expensive and relatively imprecise. In particular, transporting the gearwheel between the milling-out of the tooth spaces and the remachining of the teeth of the gearwheel can cause inaccuracies in the adjustment of the gearwheel.

It would therefore be desirable and advantageous to address prior art shortcomings and to render application of an inductive hardening process possible, without requiring any additional current supply device especially for an inductor.

SUMMARY OF THE INVENTION

According to one aspect of the present invention, a method for manufacturing a gearwheel includes clamping a gearwheel blank in a workholder of a multi-axis machine tool, clamping a milling head in a tool holder of the multi-axis machine tool, rotating the tool holder by a spindle drive to enable the milling head to mill out tooth spaces of the gearwheel blank to thereby create a gearwheel having teeth, replacing the milling head in the tool holder by an inductor, inserting the inductor successively between two adjacent teeth of the gearwheel, supplying the inductor with alternating current from a current supply device of the spindle drive to inductively heat at least one of the two adjacent teeth, replacing the inductor in the tool holder by a machining tool, and remachining the teeth of the gearwheel by the machining tool.

Any additives required for the hardening process are in the inventive procedure generally already contained in the material of the gearwheel blank.

According to another advantageous feature of the present invention, the multi-axis machine tool can be designed as an at least five-axis machine tool. In this way, a method according to the present invention is especially simple to implement.

According to another advantageous feature of the present invention, the at least one inductively heated tooth is actively cooled by a cooling medium after termination of inductive heating, and the inductor is transferred during active cooling of the at least one inductively heated tooth for insertion between two other adjacent teeth of the gearwheel for inductively heating at least one of the two other adjacent teeth. This procedure results in an especially time-saving manufacture of the gearwheel.

According to another advantageous feature of the present invention, the alternating current may have a frequency between 5 kHz and 40 kHz. As a result, energy is efficiently utilized when heating the teeth of the gearwheel. Advantageously, the frequency of the alternating current may be at least 16 kHz. Currently preferred is a frequency of at least 32 kHz.

According to another advantageous feature of the present invention, the frequency of the alternating current to a current supply device of the inductor can be predefined by a control device of the multi-axis machine tool.

According to another advantageous feature of the present invention, an alternating voltage can be transformed downward by a transformer before being supplied to the inductor. In this way, the current supply device can be designed especially compact. This applies especially when a transformer ratio of the transformer is between 5:1 and 20:1.

According to another advantageous feature of the present invention, the inductor can be supplied with single-phase or three-phase alternating current by a current supply device. Currently preferred is the supply of the inductor with three-phase alternating current.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
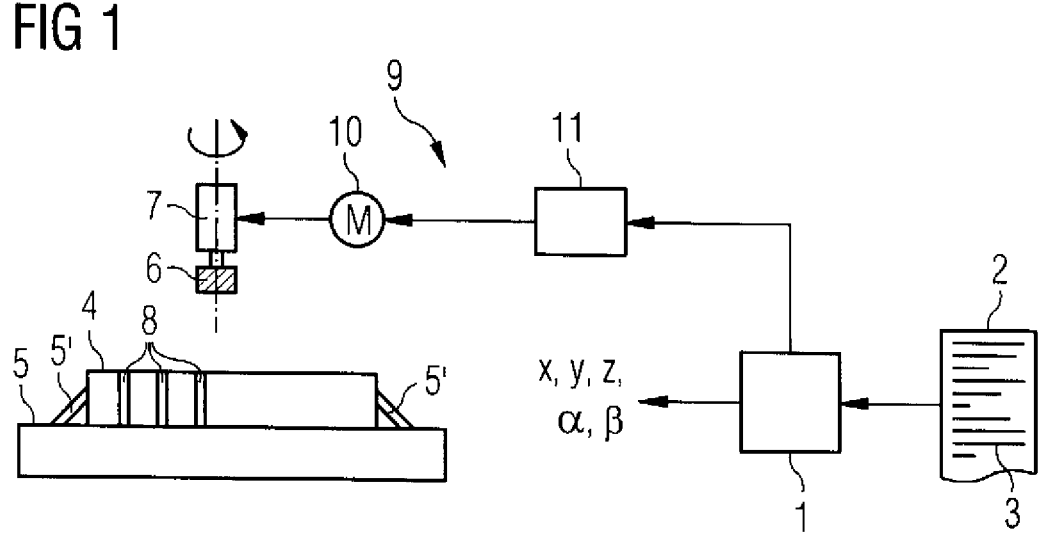
FIG. 1 shows a schematic illustration of a multi-axis machine tool for executing a method according to the present invention, depicting the multi-axis machine tool in a first operating state.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a multi-axis machine tool for executing a method according to the present invention. The multi-axis machine tool is controlled by a control device 1 and can be designed as required. In the non-limiting example of FIG. 1 the multi-axis machine tool 1 is designed as an at least five-axis machine tool, i.e. it has at least five position-controlled axes. This is indicated in FIG. 1 in that the control device 1 issues three position values x, y, z and two orientation values α, β to the machine tool.

The control device 1 is designed as a software-programmable control device, in particular as a CNC. The method of operation of the control device 1 (and thus also the operating mode of the multi-axis machine tool overall) is determined by a control program 2, with which the control device 1 is programmed. The control program 2 comprises machine code 3 which can be immediately executed by the control device 1. The execution of the machine code 3 by the control device 1 means that the control device 1 controls the multi-axis machine tool in accordance with a manufacturing process which is explained in detail below in conjunction with FIG. 2. Additionally FIGS. 1, 3, 4 and 5 are also to be consulted in conjunction with the explanation of FIG. 2.

Figure 2:
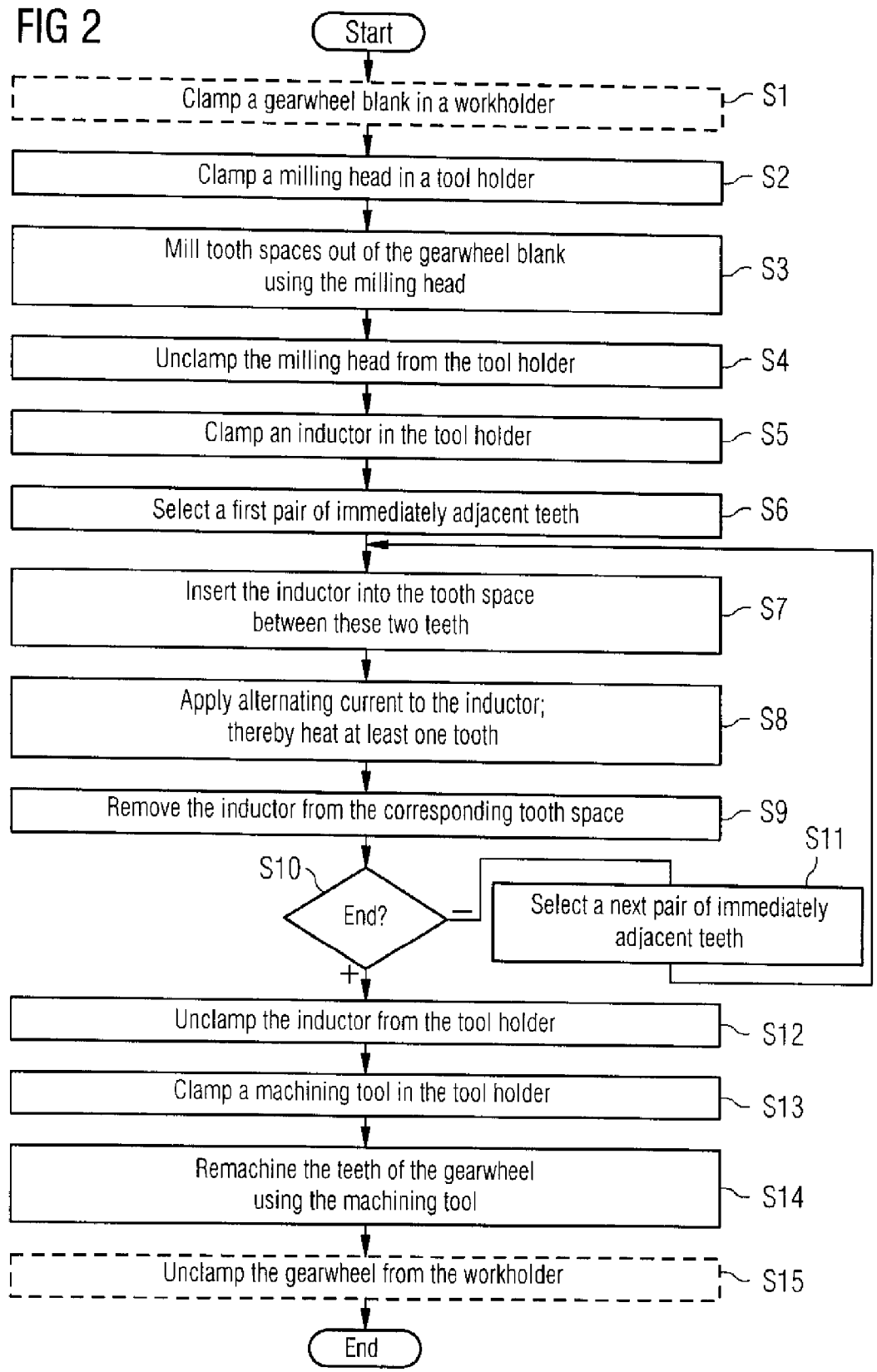
FIG. 2 shows a flow chart of the method according to the present invention.

According to FIG. 2, in a step S1 a gearwheel blank 4 is first clamped in a workholder 5 of the multi-axis machine tool. It is held in the workholder 5 by means of suitable clamping devices 5'. The clamping is generally performed by a person (or several people) or a robot. Step S1 is illustrated in FIG. 2 only by way of a dotted line, in order to indicate that it is a step which is generally not performed by the control device 1.

In a step S2 a milling head 6 is clamped in a tool holder 7 of the multi-axis machine tool. Step S2 can be performed by a person. Generally step S2 is controlled automatically by the control device 1 in the context of the execution of the machine code 3 of the control program 2.

In a step S3 tooth spaces (see FIG. 3) are milled out of the gearwheel blank 4 by the milling head 6. By milling out the tooth spaces from the gearwheel blank 4 a gearwheel 4' is produced from the gearwheel blank 4. The gearwheel 4' has teeth 8. While the tooth spaces are being milled out of the gearwheel blank 4 the tool holder 7 (and with it the milling head 6) is rotated by means of a spindle drive 9. The spindle drive 9 has a motor 10 and a converter 11. The converter 11 corresponds to a current supply device for the spindle drive 9.

Step S3 is controlled automatically by the control device 1. The implementation of step S3 in the context of the control program 2 is familiar to persons skilled in the art.

Figure 4:
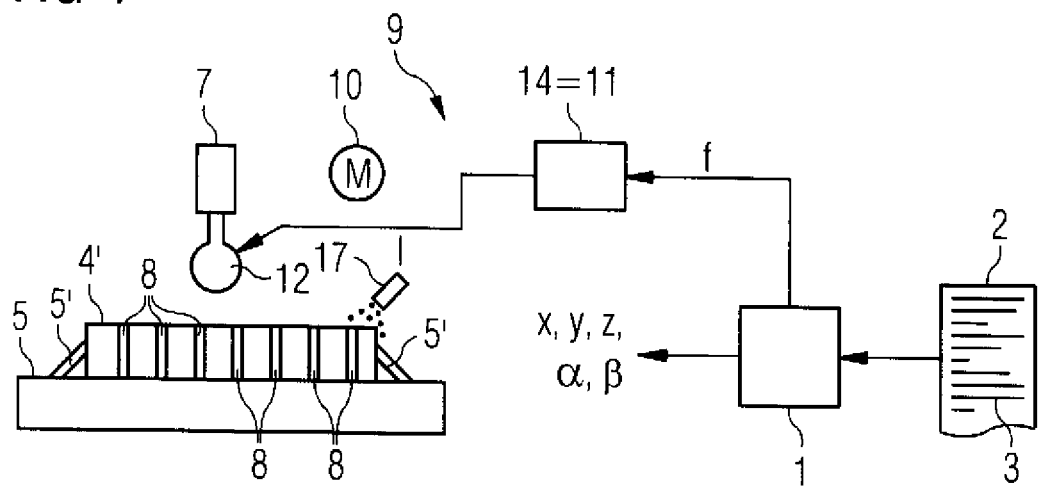
FIG. 4 shows the multi-axis machine tool of FIG. 1 in a second operating state.
Figure 5:
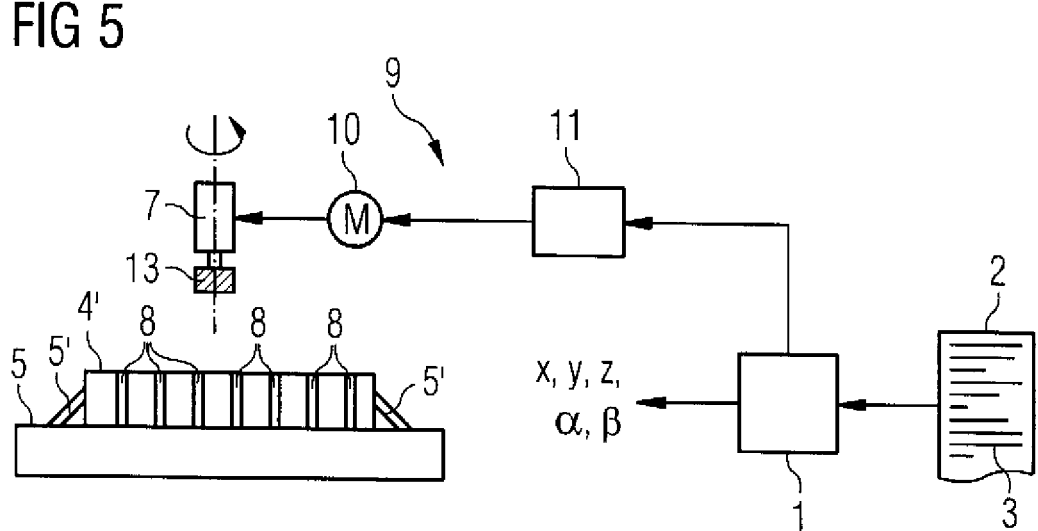
FIG. 5 shows the multi-axis machine tool of FIG. 1 in a third operating state.

In steps S4 and S5 the milling head 6 is first unclamped from the tool holder 7. An inductor 12 is then clamped in the tool holder 7. FIG. 4 shows the corresponding state of the multi-axis machine tool.

Similarly to step S2, steps S4 and S5 can be performed by a person. Advantageously steps S4 and S5 are controlled automatically by the control device 1 in the context of the execution of the machine code 3 of the control program 2.

Figure 3:
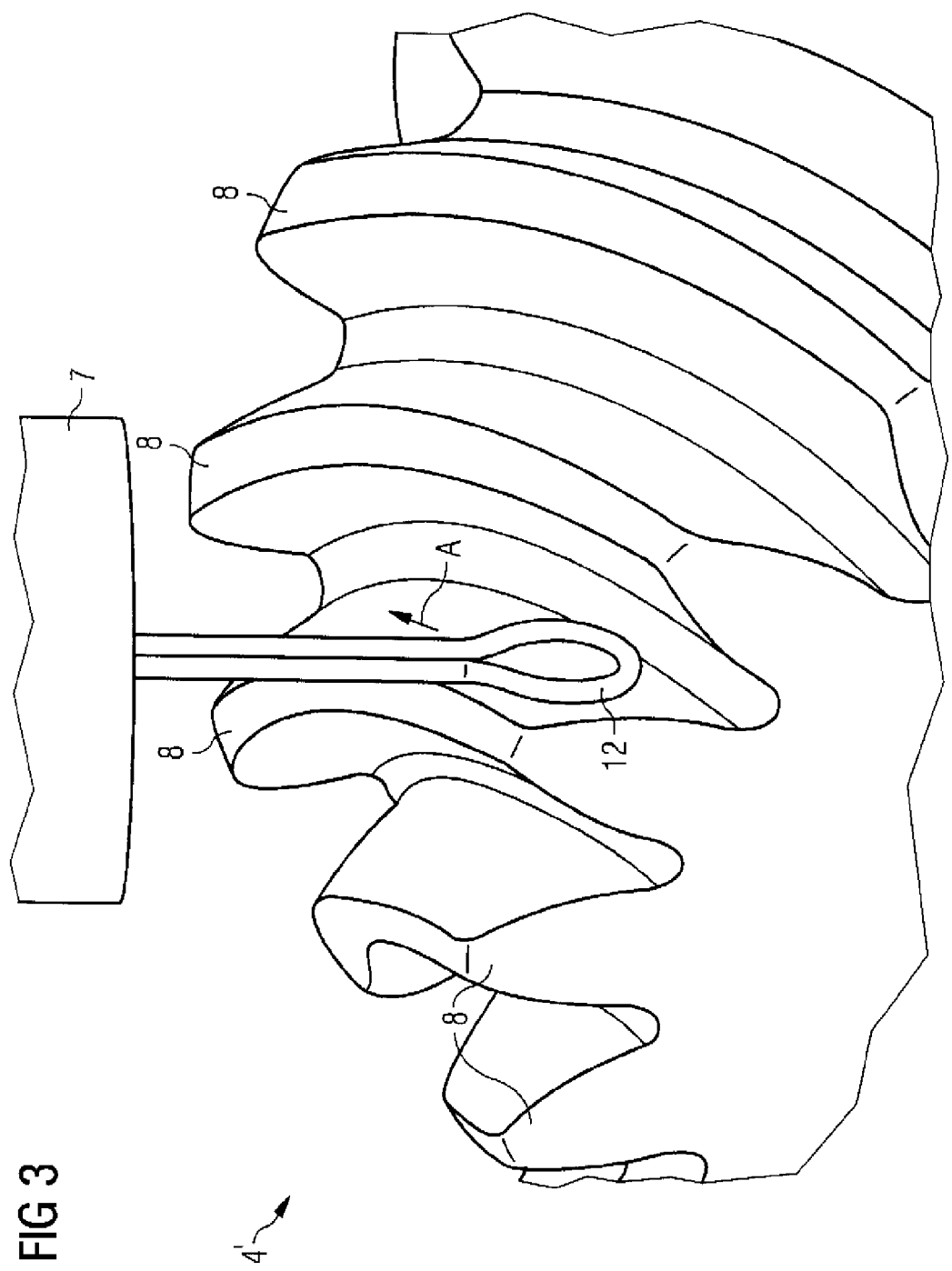
FIG. 3 shows a section of a gearwheel and an inductor.

In a step S6 the control device 1 selects a first pair of immediately adjacent teeth 8 of the gearwheel 4'. In a step S7 the inductor 12 is inserted into the tooth space between these two teeth 8. The corresponding state of the inductor 12 is illustrated in FIG. 3. In a step S8 alternating current I is applied to the inductor 12. The alternating current I generates eddy currents in at least one of the teeth 8 of the corresponding pair of teeth 8. The corresponding tooth 8 is heated by the eddy currents in conjunction with the ohmic resistance of the corresponding tooth 8.

It is possible that the inductor 12, in accordance with the illustration in FIG. 3, is disposed closer to the one tooth 8 of the corresponding pair of teeth 8 than to the other tooth 8. In this case essentially only one of the two teeth 8 is heated to a significant extent. Alternatively it is possible for the inductor 12—exactly or at least approximately—to be disposed in the center between the two teeth 8 of the corresponding pair of teeth 8. In this case both teeth 8 are heated more or less uniformly.

After the inductor 12 has been inserted into the respective tooth space, the inductor 12 is generally moved in accordance with the respective tooth flank, in order gradually to heat the whole tooth flank—see arrow A in FIG. 3. However, this is not always and absolutely necessary.

If—in respect of the respective tooth space—the respective heating operation has terminated, the inductor 12 is moved out of the corresponding tooth space in accordance with FIG. 2 in a step S9.

In a step S10 the control device 1 checks whether the inductive heating should be terminated. In particular the control device 1 can check in step S10 whether all teeth 8 to be heated have already been heated. If the inductive heating should not be terminated, the control device 1 switches to a step S11, in which it selects the next pair of teeth 8. The term "next" refers in this connection to the pair of teeth 8 which is the next in time to be selected. It can, in relation to the previously selected pair of teeth 8, relate to the geometrically next pair of teeth 8. However, this is not absolutely necessary. From step S11 the control device 1 returns to step S7.

Steps S6 to S11 are controlled automatically by the control device 1. They form part of the control program 2.

When the inductive heating is to be terminated in full, a switch is made to steps S12 and S13. In step S12 the inductor 12 is unclamped from the tool holder 7. In step S13 a machining tool 13 is clamped in the tool holder 7 (see FIG. 5). The machining tool 13 can for example be a milling or grinding head. In the case of a milling head it can be the same milling head 6 as was used in the context of the execution of step S3. Alternatively it can be a different milling head. The explanations above for steps S4 and S5 apply analogously in respect of steps S12 and S13: they can be performed by a person, but are generally controlled automatically by the control device 1 in the context of the execution of the control program 2.

In a step S14 the teeth 8 of the gearwheel 4' are remachined by the machining tool 13. Step S14 is controlled automatically by the control device 1 in the context of the execution of the machine code 3.

Finally in a step S15 the gearwheel 4' is unclamped from the workholder 5 of the multi-axis machine tool. The unclamping is generally performed by a person (or several people) or a robot. Step S15 is only shown by a dotted line in FIG. 2 to indicate that it—similarly to step S1—relates to a step which is not executed by the control device 1.

Figure 6:
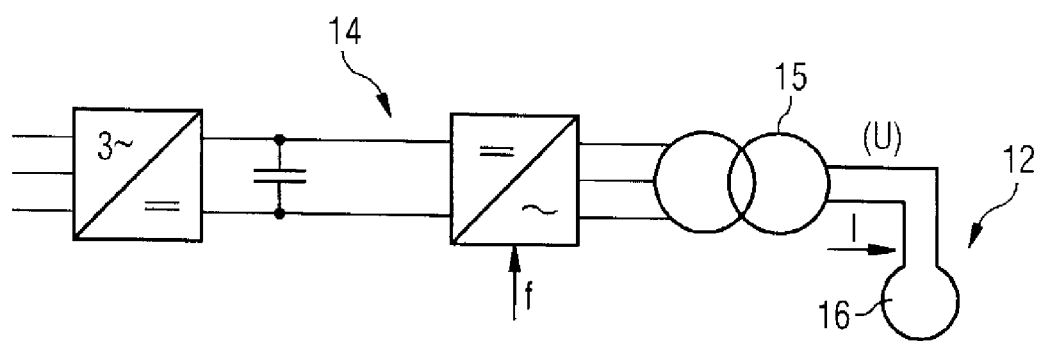
FIGS. 6 and 7 each show an inductor and its connection to a current supply device.
Figure 7:
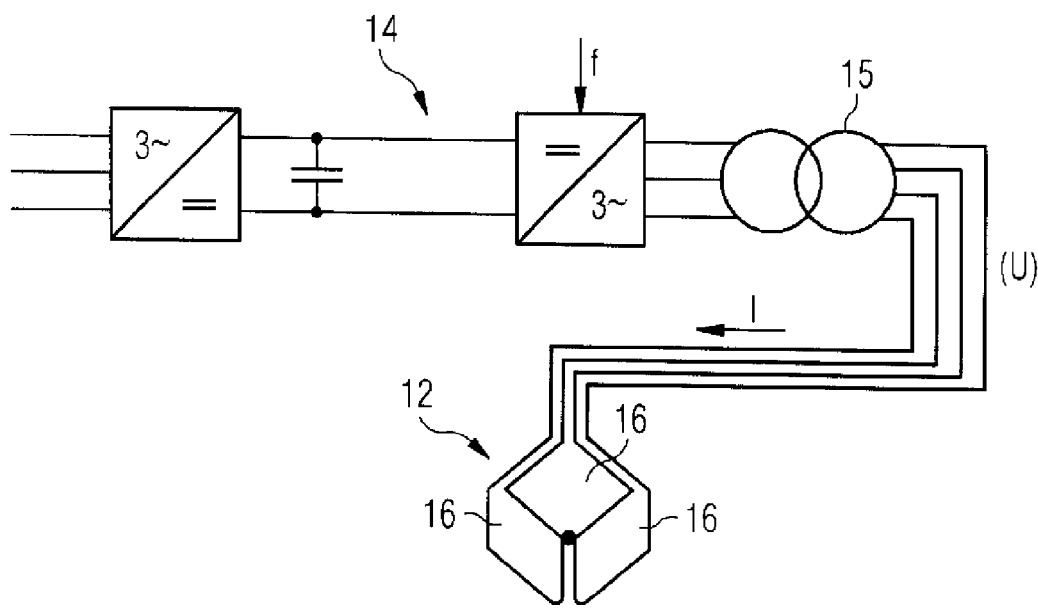

As is apparent from FIGS. 6 and 7, the inductor 12 is supplied with alternating current I from a converter 14 for the inductive heating of the respective tooth 8 (or of the respective pair of teeth 8). The alternating current I has a rated current intensity and a fundamental frequency f.

The fundamental frequency f is generally between 5 kHz and 40 kHz. Advantageously it is at least 16 kHz, in particular at least 32 kHz. The fundamental frequency f can be fixedly specified in advance. Advantageously the fundamental frequency f is specified to the converter 14 (=the current supply device of the inductor 12) by the control device 1.

The rated current intensity of the alternating current I is considerable. The rated current intensity can be greater than 1 kA. The required alternating voltage U is in contrast relatively low (generally 40 V to 100 V). Advantageously a transformer 15 is hence disposed between the current supply device 14 and the inductor 12. Using the transformer 15 the alternating voltage—for example 400 V or 690 V—emitted by the current supply device 14 is transformed downward before being supplied to the inductor 12. Correspondingly the current intensity is accordingly transformed upward.

The transformer 15 has a transformer ratio. The transformer ratio can be selected as required. Generally it is between 5:1 and 20:1, for example between 8:1 and 12:1.

The inductor 12 may be designed as a single conductor loop 16 which is supplied with single-phase alternating current by the current supply device 14 of the inductor 12. This is illustrated in FIG. 6. Advantageously however the inductor 12 is comprised of three conductor loops 16. This embodiment is illustrated in FIG. 7. In this case the inductor 12 can be supplied with three-phase alternating current I by the current supply device 14. The three conductor loops 16 advantageously adjoin one another without overlapping. The three conductor loops 16 lie in a common plane. They advantageously delimit—both individually and together—a convex surface, for example individually each a rectangle and together a hexagon.

The tool holder 7 is driven by the spindle drive 9, see FIG. 1. In particular the tool holder 7 is rotated by means of the spindle drive 9 while the tooth spaces are milled out of the gearwheel blank 4. Generally the tool holder 7 is also rotated by the machining tool 13 during the remachining. The converter 11 of the spindle drive 9 (=its current supply device) generally supplies the motor 10 with three-phase alternating current. It is possible that the current supply device 11 of the spindle drive 9 and the current supply device 14 of the inductor 12 are different devices from each other. Advantageously the inductor 12 is however supplied with alternating current I from the current supply device 11 of the spindle drive 9 during the inductive heating of the teeth 8 in accordance with the illustration in FIGS. 1 and 3—see the arrangement of the converter 11 in FIG. 1 at the same position as the arrangement of the converter 14 in FIG. 4 and the equating of the reference characters 11 and 14 in FIG. 4. This embodiment is particularly advantageous if the inductor 12 is supplied with three-phase alternating current I.

As explained above, in the inventive manufacturing process the teeth 8 of the gearwheel 4' are inductively heated individually or in pairs. Advantageously the teeth 8 are actively cooled by means of a cooling medium (compressed air or—advantageously—water) after the termination of the inductive heating. For this reason. FIG. 4 also shows a cooling device 17, which in FIG. 4 is illustrated schematically as an injection nozzle. The cooling medium is applied to the corresponding tooth 8 by means of the cooling device 17. The application of the cooling medium is also effected by corresponding control of the multi-axis machine tool by the control device 1, in other words in the context of the execution of the machine code 3 of the control program 2.

To implement the active cooling after the inductive heating it is possible for the cooling device 17 to be disposed at a predetermined position of the multi-axis machine tool and for the gearwheel 4' to be correspondingly positioned in each case by corresponding control of the workholder 5. Alternatively it is possible for the cooling device 17 to be positioned and tracked by the control device 1—at least within certain limits.

It is possible for the active cooling of the teeth 8 to be performed only after the inductive heating of all teeth 8. It is also possible to execute the inductive heating of the teeth 8 and the active cooling of the teeth 8 intermittently, in other words to heat one tooth 8 or two teeth 8, then to cool this tooth 8 or these two teeth 8, then to heat another tooth 8 or two other teeth 8, etc. Advantageously however the inductive heating and the active cooling are effected simultaneously. Advantageously therefore during the active cooling of an immediately previously heated tooth 8 or of two immediately previously heated teeth 8 the inductor 12 is inserted into the tooth space between two other teeth 8, where the inductor 12 inductively heats at least one of the two latter teeth 8.

The present invention has many advantages. The biggest advantage is that all the machining can be done without having to unclamp the gearwheel 4' temporarily from the workholder 5 and clamp it in again later. Thus the gearwheel blank 4 is clamped in the workholder 5 before the tooth spaces are milled out and remains clamped there until the gearwheel 4' is unclamped from the workholder 5 after the remachining of the teeth 8. Thus it is possible to manufacture the gearwheel 4' from the gearwheel blank 4 in a single clamping operation and in a single multi-axis machine tool. The control program 2 can in particular be designed as a uniform control program which implements the whole procedure in FIG. 2, in other words both the milling in step S3 and the hardening in steps S6 to S11 as well as the remachining in step S14 and if necessary also steps S2, S4, S5, S12 and S13. By adjusting the frequency of the alternating current I of the inductor 12 the penetration depth can be further controlled, so that—in comparison to complete heating of the gearwheel 4—a further control parameter for optimization is available. The inventive procedure results firstly in accelerated manufacturing of the gearwheel 4' and secondly in an improved manufacturing precision. Furthermore it is no longer necessary to heat the gearwheel 4' through completely, so that an energy saving can also be achieved. Because the teeth 8 of the gearwheel 4 are only heated locally—in contrast to complete heating of the gearwheel 4'—there is furthermore a reduction in so-called deformation due to hardening, so that the tooth spaces can be milled out with a smaller allowance and as a result remachining can be effected more easily and quickly.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for manufacturing a gearwheel, comprising:
    clamping a gearwheel blank in a workholder of a multi-axis machine tool;
    clamping a milling head in a tool holder of the multi-axis machine tool;
    rotating the tool holder by a spindle drive to enable the milling head to mill out tooth spaces of the gearwheel blank to thereby create a gearwheel having teeth;
    replacing the milling head in the tool holder by an inductor;
    inserting the inductor successively between two adjacent teeth of the gearwheel;
    supplying the inductor with an alternating current from a current supply device of the spindle drive to inductively heat at least one of the two adjacent teeth;
    actively cooling the at least one inductively heated tooth by a cooling medium after termination of inductive heating, and transferring the inductor during active cooling of the at least one inductively heated tooth for insertion between two other adjacent teeth of the gearwheel for inductively heating at least one of the two other adjacent teeth;
replacing the inductor in the tool holder by a machining tool; and
remachining the inductively heated and cooled teeth of the gearwheel by the machining tool;
wherein the gearwheel blank is held by the workholder in a single clamping operation during the milling step through the remachininq step and wherein the active cooling of the at least one inductively heated tooth and the inductive heating of the at least one of the two other adjacent teeth are effected simultaneously.

2. The method of claim 1, further comprising transforming downward an alternating voltage by a transformer before being supplied to the inductor.

3. The method of claim 2, wherein a transformer ratio of the transformer is between 5:1 and 20:1.

4. The method of claim 1, wherein the alternating current has a frequency between 5 kHz and 40 kHz.

5. The method of claim 1, wherein the alternating current has a frequency of at least 16 kHz.

6. The method of claim 1, wherein the alternating current has a frequency of at least 32 kHz.

7. The method of claim 1, further comprising predefining a frequency of the alternating current to the current supply device of the spindle drive by a control device of the multi-axis machine tool.

8. The method of claim 1, wherein the multi-axis machine tool is designed as an at least five-axis machine tool.

9. The method of claim 1, further comprising supplying the inductor with single-phase or three-phase alternating current.

* * * * *